United States Patent [19]

Jones et al.

[11] Patent Number: 4,698,742

[45] Date of Patent: Oct. 6, 1987

[54] HIGH-VOLTAGE MILBERGER SLIP SLIDE POWER CONDITIONER

[75] Inventors: Franklin B. Jones, Baltimore; Walter E. Milberger, Severna Park; David E. Bulgher, Ellicott City; Charles S. Kerfoot, Pasadena, all of Md.

[73] Assignee: The United States of America as represented by the Secretary of the Air Force, Washington, D.C.

[21] Appl. No.: 891,821

[22] Filed: Aug. 1, 1986

[51] Int. Cl.$^4$ .............................................. H02M 7/00
[52] U.S. Cl. ..................................... 363/124; 363/43; 363/71; 363/134
[58] Field of Search ............................ 363/43, 46–48, 363/20–21, 24–26, 71, 97, 124, 133–134

[56] References Cited

U.S. PATENT DOCUMENTS

| | | | |
|---|---|---|---|
| 3,374,414 | 3/1968 | Garnett | 363/43 |
| 3,768,000 | 10/1973 | Bates | 363/134 X |
| 3,852,655 | 12/1974 | Justice | 363/71 X |
| 3,925,715 | 12/1975 | Venable | 363/26 |
| 4,034,280 | 7/1977 | Cronin et al. | 363/25 |
| 4,159,513 | 6/1979 | Gemp et al. | 363/71 X |
| 4,187,458 | 2/1980 | Milberger et al. | 323/17 |
| 4,208,706 | 6/1980 | Suzuki et al. | 363/26 |
| 4,556,937 | 12/1985 | Ziogas et al. | 363/71 X |

Primary Examiner—Peter S. Wong
Attorney, Agent, or Firm—William G. Auton; Donald J. Singer

[57] ABSTRACT

A high-voltage converter circuit which uses a slip slide power conditioner to reduce non-monotonic non-linearities in the converter output signal is disclosed. The slip slide power conditioner includes: a choke feed D.C. circulator; two radio frequency (RF) power pumps; a phase detector; a phase controller; and a combiner. The choke feed D.C. circulator receives the D.C. input signal and produces therefrom two voltage output signals which are each sent to one of the two RF power pumps. The two RF power pumps produce two out-of-phase square wave output signals which are algebraically combined in the combiner to form an output signal whose amplitude is a function of phase difference. The phase detector and phase controller sample this output signal and adjust the phase of the two power pumps to remove non-linearities due to secondary ranging (resonance) that beats with harmonics of their square wave signals.

11 Claims, 14 Drawing Figures

INPUT #1

INPUT #2

RIPPLES ADDED

2V

OUTPUT

HIGH-VOLTAGE MILBERGER SLIP SLIDE POWER CONDITIONER

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in the following U.S. Patent Applications: Application Serial No. 891,822, filed Aug. 1, 1986 entitled SLEWING POWER SUPPLY FOR PROGRAMMABLE PHASE SHIFTER DRIVE by Franklin B. Jones et al; Application Serial No. 893,831, filed August 6, 1986 entitled "Self-Generated Converter Filter" by C. S. Kerfoot et al and application Ser. No. 910,113, filed Jan. 28, 1986, entitled "Energy Recoverable Choke Feed" by W. E. Milberger et al.

BACKGROUND OF THE INVENTION

The present invention relates generally to electric power conversion systems, and more specifically to a high-voltage high-frequency converter with a slip slide power conditioner which removes non-monotonic non-linearities induced by stray capacitances and inductance leakae in transformer windings.

Chopper converter power supplies are useful for converting a D.C input into a new D.C voltage or an A.C. voltage of a desired frequency. This result is achieved by passing the input D.C. voltage through a series of switches simulating an A.C. voltage which is impressed upon the primary of a transformer. The secondary output voltage is dependent upon the ratio of the number of the windings of the primary to the secondary, while the frequency of the output voltage is dependent upon the rate of switching of the input D.C. voltage. Where the chopper is driven by high-frequency switching signals, an equivalent high frequency output can be achieved.

In conventional D.C.-to-D.C. converter systems, the output signals are often subject to contamination by the effects of stray capacitances and inductance leakage in the windings of the transformer. Exemplary converter system are disclosed in the following U.S. Patents, the disclosures of which are incorporated by reference:

U.S. Pat. No. 3,925,715 issued to Venable;
U.S. Pat. No. 4,034,280 issued to Crownin et al;
U.S. Pat. No. 4,187,458 issued to Milberger et al; and
U.S. Pat. No. 4,208,706 issued to Suzuki et al.

All of the above-cited references disclose conditioning circuits which are designed to act as L-C filters and reduce stray inductance and capacitance contamination in the output of converters. Currently, there exists a need to reduce such contamination in high-power applications of Milberger converter systems.

The Milberger converter is best understood by referring to the U.S. patent application Ser. No. 910,113 entitled "The Milberger Converter", filed on Jan. 28, 1986, the disclosure of which is incorporated by reference. The Milberger converter has an advantage over conventional converters in that its output is conditioned by two independent square waves which either add or cancel. The output voltage is directly proportional to a percentage of addition time to the total time, i.e., Vo equals Vp ($T_{ADD}/T_{TOTAL}$).

As disclosed in the above-cited reference, the Milberger converter's 100 percent dynamic range, small size, and reduced number of parts are among its main advantages. However, a problem has been encountered when the Milberger converter is used in high voltage and high power applications. Medium power is, in the present context, defined as electrical power of around 100 watts, and high-power is considered to be electrical power above 10 kw. In high-voltage and high-power applications there exists a non-monotonic increase in the output voltage of the Milberger converter, which occurs when its control circuit commands a linear increase. Investigation of the phenomenon indicates that it is caused by the occurrence of the presence of an ultra-high frequency ripple on top of the pulses of the output waveform. When this ripple is in phase with the output signal, it adds and the output increases. As the phase of the ripple shifts, it alternately increases and decreases on top of the output signal.

The task of reducing these non-monotonic increases in the output signals of Milberger converters in high-power applications is alleviated by the U.S. patent application entitled "Self-Generated Converter Filter" by C. S. Kerfoot et al, the disclosure of which is incorporated by reference. The disclosure of Kerfoot et al describes the design of Milberger converter systems and provides self-generated conditioning to their output signal which has the same effect as an "add-on" filter. The design of the Kerfoot et al reference produces a reduction of non-monotonic degradation characteristics of converter output signals by minimizing the number of secondary windings used in the transformer. More specifically, the transformer is redesigned so that it retains its primary winding; but its secondary windings (being n in number and having a total of N turns) is, in one embodiment, replaced by m replacement secondary windings (where m is an integer less than n). When the replacement secondary windings have a total of N turns they produce an output signal with reduced degradation normally caused by stray capacitance and inductance leakage in the secondary windings.

The Kerfoot et al reference is directed towards the same problem as the present invention. However, it is not always convenient to replace the transformer secondary windings, as proposed by Kerfoot et al. In such instances, there remains a need to provide a power conditioner which reduces the effects of stray capacitances and inductance leakages on the output signal of converters (including the Milberger Converter). The present invention is intended to satisfy that need.

SUMMARY OF THE INVENTION

The present invention is a high-voltage converter circuit with a slip slide power conditioner which reduces non-monotonic non-linearities in the converter output signals. One embodiment of the slip slide power conditioner comprises: a choke feed D.C. circulator; two radio frequency (RF) power pumps; a phase detector; a phase controller; and a combiner.

The choke feed D.C. circulator receives a D.C. input signal and produces therefrom two voltage output signals which are each sent to one of the two RF power pumps. The purpose of the choke feed circulator is to supply a current feed to both the power pumps with current limiting imposed on the D.C.input signal. This current limiting is intended to minimize transistor switch through losses, and is also effective when short circuit and overload conditions appear at the load. The choke feed D.C. circulator is intended to provide failsafe protection to the circuit, enhance the full load efficiency, and divide the D. C. input signal into a first and second voltage reference signal which are each sent to the two power pumps.

The two RF power pumps are actually two phase control choppers that produce two out of phase square wave output signals which are algebraically combined in the combiner to form an output signal whose amplitude is a function of phase difference. The first of the two phase control choppers is a continuous phase pump which receives the first voltage reference signal from the choke feed D.C. circulator and produces therefrom a continuous phase square wave signal. The second of the two RF power pumps is a reference phase pump which receives the second voltage reference signal from the choke feed D.C. circulator, and produces therefrom a reference phase square wave signal.

The combiner receives and combines both the continuous and the reference phase square wave signal to produce the output signal. This output is monitored by the phase detector, which produces therefrom a phase control error signal to the phase controller which, in turn, controls the two RF power pumps. The resultant output of the combiner is conditioned to remove non-linearities due to secondary ringing (resonance) that beats with harmonics of the chopper frequency.

It is a principal object of the present invention to provide a design which reduces degradation of the output signals of converters due to stray capacitance and inductance leakage in their output transformers.

It is another object of the present invention to provide a means of reducing non-monotonic non-linearities in the output signals of Milbergeer converters in high-power applications.

It is another object of the present invention to reduce degradation in the output signal of Milberger converters using slip slide power conditioning to remove non-linearities due to secondary ringing that beats with harmonics of chopper frequencies.

It is another object of the present invention to reduce output stray capacitances and inductance leakage, without changing the design of the transformer itself.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a high-voltage slip slide power condition which reduces signal degradation in high-power applications of converters, including Milberger converters.

Figure 1:
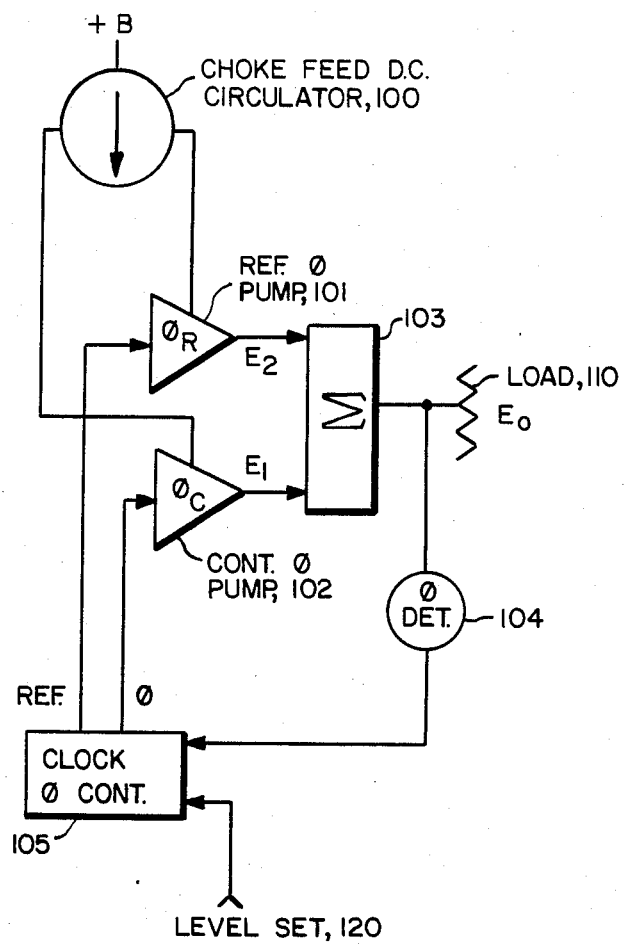
FIG. 1 is an electrical schematic of an embodiment of the present invention

The reader's attention is now directed towards FIG. 1, which is an electrical schematic depicting an embodiment of the present invention. The system of FIG. 1 comprises: a choke feed D.C. circulator 100, two RF power pumps 101, 102, a combiner 103, a phase detector 104, and a phase controller 105.

The embodiment of FIG. 1 is specifically designed to improve the performance of the Milberger Converter in high-power applications (electrical power above 10 kilowatts). The Milberger converter is described in the above-cited reference of Milberger et al, and consists of two or more current-fed square wave choppers whose phase relationship may be varied over 180 degrees. When the outputs of two such choppers are combined by a common secondary transformer winding, the average output voltage may be varied from zero to twice the square wave amplitude. The new converter differs from the old phase controlled converters in that it provides frequency agility and in-line current limiting at high efficiencies over a wide frequency range.

Figure 2:
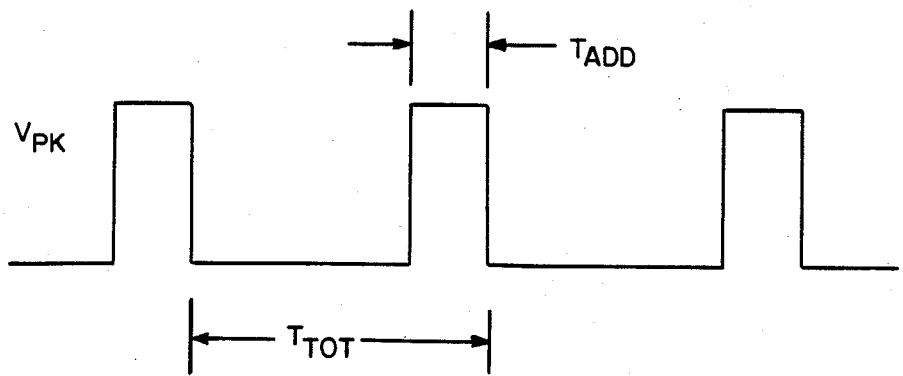
FIG. 2 is a chart of the output voltage of a Milberger converter.

The Milberger Converter-Regulator works by the principal of having parts of two independent square waves either add or cancel. The output voltage is directly proportional to the percentage of addition time to the total time, i.e., $Vo = V_p(T_{ADD}/T_{TOTAL})$, as illustrated in FIG. 2.

As mentioned above, when the Milberger Converter-Regulator is used in high-voltage applications, there exists a non-monotonic increase in the output voltage as the control circuit demands a linear increase. As illustrated in FIGS. 3A, 3B, 3C and 4A, 4b and 4C, this is caused by the ultra-high frequency ripple on top of the two input pulses on the top of the output pulses.

Figure 3A:
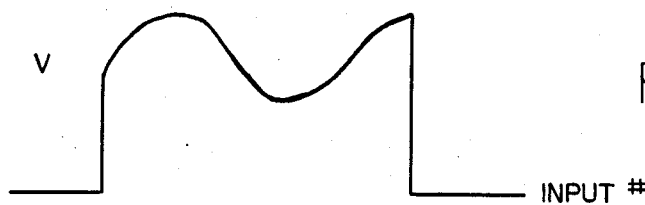
FIGS. 3A, 3b, and 3C are, respectively, illustrations of a first input signal, and second input signal, which produces an output signal in which ripples add.
Figure 3B:
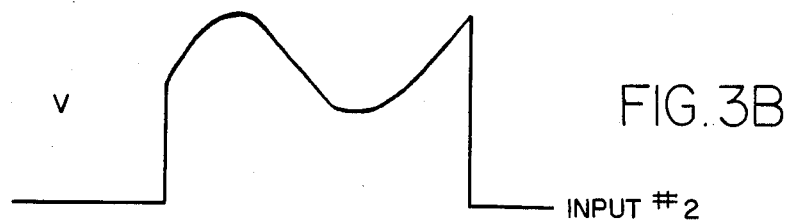
Figure 3C:
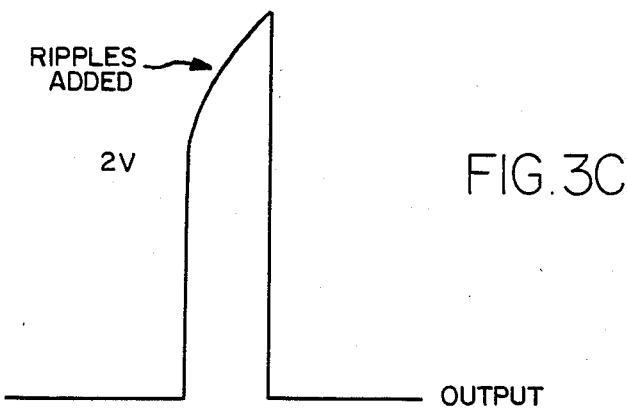
Figure 4A:
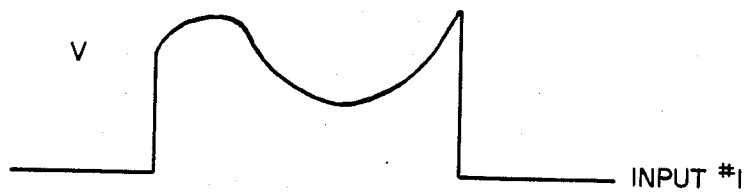
FIG. 4A, 4B, and 4C are, respectively, illustrations of a first input signal, and second input signal, which produces an output signal in which ripples cancel.
Figure 4B:
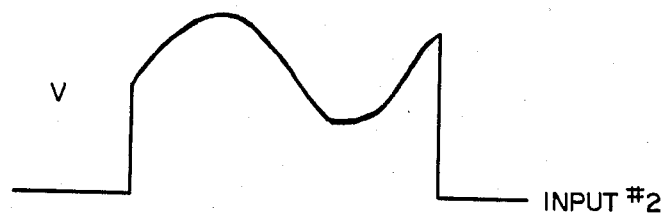
Figure 4C:
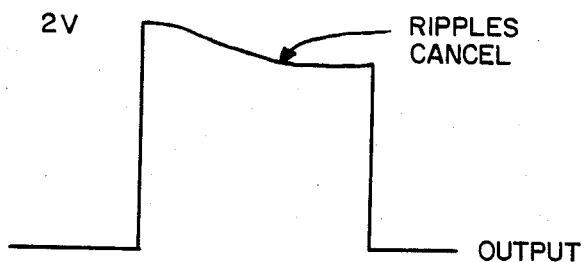

FIGS. 3A and 3B depict two degraded square waves of a Milberger converter where ripples add in the output signal of FIG. 3C. FIGS. 4A and 4B depict two degraded square waves of a Milberger converter whose ripples subtract in the output signal of FIG. 4C. When the ripple is in phase, it adds and the output increases. As the phase shifts, it alternately increases and decreases on top of the linear increase. The present invention, provides a conditioned output in which the non-linearities due to secondary ringing (resonance) that beats with harmonics of the chopper frequency is removed.

The problem that arises by reflecting leakage inductance, rather than open circuit inductance, during the converter cross-over transitions is that the source impedance of secondary parasitic resonance becomes very low. Such ringing is also present in choppers that see open circuit inductance during the switching transitions. In that case, however, ringing is easily damped by the chopper transistor resistance (Rs). The ringing is easily damped by the chopper transistor resistance (Rs). The parasitic tank impedance is relative high, since the inner winding capacitance (C) resonates with open circuit inductance (Lo), where:

$$Z_o = \sqrt{L_o/C}$$

When the resonance results from the leakage inductance ($L_L$) and the inner winding capacitance (C), the ringing frequency goes up by $\sqrt{(L_o/L_L)}$ and the reflected impedance goes down by $\sqrt{(L_o/L_L)}$.

The chopper switch resistance is less effective in damping the ringing because of the lower tank impedance. Moreover, the increased ringing frequency greatly extends the range that the chopper frequency and the ringing frequency can produce beats. In high-voltage supplies, which require high-voltage isolation between the primary and secondaries, these beats cause amplitude variations of the slip-slide output as a function of deviation under light-load conditions.

Returning now to FIG. 1, the high-voltage Milberger slip slide power conditioner operates as follows. The choke feed D.C. circulator 100 receives the D.C. input signal and produces therefrom two voltage output signals which are each sent to one of the two RF power pumps 101 and 102. The purpose of the choke feed circulator 100 is to supply a current feed to both the power pumps with current limiting imposed on the D.C. input signal. This current limiting is intended to minimize transistor switch through losses, and is also effective when short circuit and overload conditions appear at the load. The choke feed D.C. circulator 100 is intended to provide fail-safe projection to the circuit, enhance the full load efficiency, and divide the D.C. input signal into a first and second voltage reference signal which are each sent to the two power pumps 101 and 102. A detailed circuit diagram of the choke feed D.C. circulator 100 is included in FIG. 5.

The two RF power pumps 101 and 102 are actually two phase control choppers that produce two out of phase square wave output signals which are algebraically combined in the combiner to form an output signal whose amplitude is a function of phase difference. The first of the two phase control choppers in a continuous phase pump which receives the first voltage reference signal from the choke feed D.C. circulator and produces therefrom a continuous phase square wave signal. The second of the two phase control choppers is a reference phase pump which receives the second voltage reference a signal from the choke feed D.C. circulator, and produces therefrom a reference phase square wave signal.

Figure 6A:
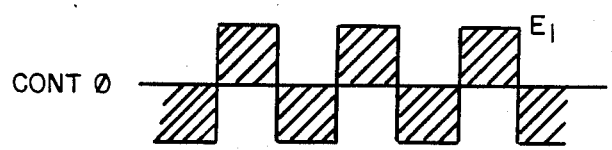
FIG. 6A, 6B, and 6C are charts respectively depicting the square wave outputs of the control phase pump, the reference phase pump; and the combiner.
Figure 6B:
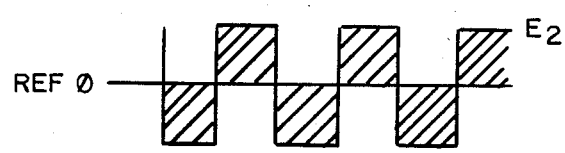
Figure 6C:
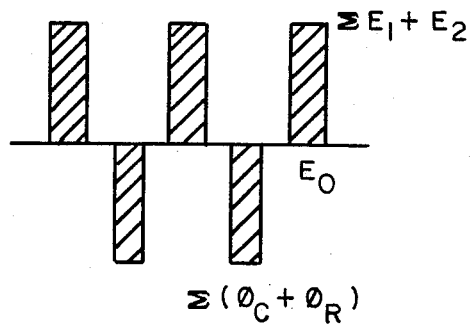

FIGS. 6A, 6B and 6C are charts respectively depicting the square wave outputs of: the control phase pumps, the reference phase pump, and the combiner 103. As indicated in FIG. 6C, the combiner 103 receives and combines both the continuous and the reference phase square wave signal to produce the output signal. This output signal is monitored by the phase detector 104, which produces therefrom a phase control error signal to the phase controller 105 which, in turn, controls the two RF power pumps. The resultant output of the combiner is conditioned to remove non-linearities due to secondary ringing (resonance) that beats with harmonics of the chopper frequency.

Figure 5:
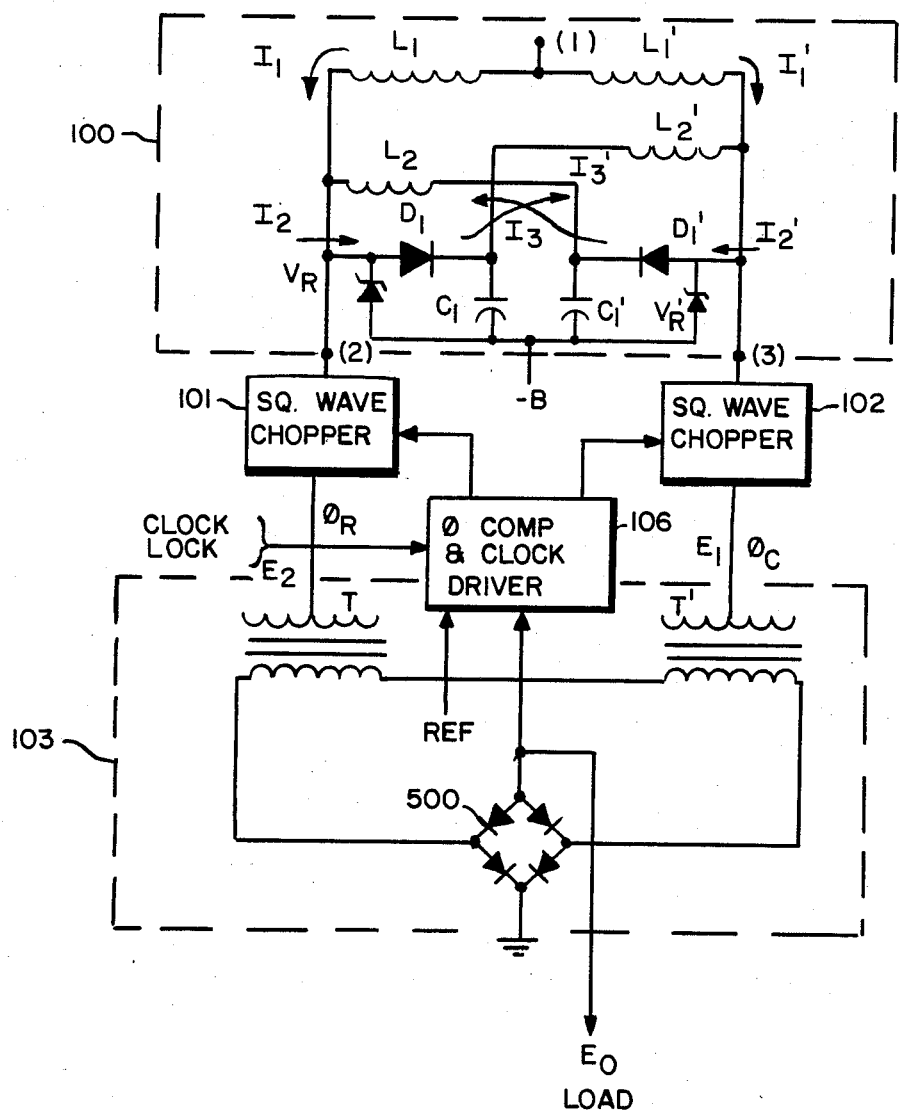
FIG. 5 is a detailed electrical circuit diagram of the present invention.

As mentioned above, FIG. 5 is a detailed circuit diagram of the embodiment of the invention which is schematically illustrated in FIG. 1. The purpose of FIG. 5 is to depict with absolute clarity the circuit elements of the choke feed circulator 100, and the combiner 103 of FIG. 1. The square wave choppers are known in the art and described in the above-cited references and need not be redescribed here. Note however that in FIG. 5 the function of the phase detector 104 and phase controller 105 is combined in one unit 106 to accomplish the phase control of the two square wave choppers as described above. The phase control unit 106 can be composed of the phase detector 104 and phase controller 105 of FIG. 1 or their electronic equivalents.

In the system of FIG. 5 and FIG. 1, two RF power pumps are used to provide out-of-phase signals that are algebraically combined to form an output whose amplitude is a function of the phase difference. The signals from the control and reference phase pumps, denoted as $E_1$ and $E_2$; and their combined output is monitored, and is used to establish the phase control error signal for the phase controller. The output will vary linearly from twice the amplitude of either pump voltage (0° and 360°) to zero (180°). This relationship is shown in the charts of FIGS. 6A, 6B and 6C. If the circuit were used as a phase detector, only the 180° null would be referenced. Employed as a regulated amplitude converter; however, only the amplitude vs. phase function is used. Either the positive or negative slope may be used to establish the control and reference phase relationship. In the case shown in FIGS. 6A–6C, the negative slope is used to provide zero to 100% deviation for the regulator. Limits stops are placed just prior to the maxima and null positions, to set the deviation range and to prevent slope hopping.

As depicted in FIG. 5, the D.C. choke circulator 100 functions, as described above, using: four inductors $L_1$, $L_2$, $L'_2$, two diodes $D_1$ and $D'_1$, two tranzorbs $Z_1$ and $Z_2$, and two capacitors $C_1$ and $C'_1$. The combiner functions as described above using two transformers T and T', and a diode quad 500.

Circulator action occurs when a load VSWR exists. If the power combining network has an inductive element; such as, transformer leakage inductance, a reactive current is caused to flow from the load through either power pump back to its respective circulator port. The energy is then stored and transferred to the opposite feed port to recover the energy.

For any given load condition, a steady-state circulating current is established within the inductive circulator. The energy stored ($LI^2$) provides a power source to accommodate load demands. The circulator action also provides a load-to-line isolation on the order of 40–60 db, depending on the circuit constants.

Referring to the circulator circuit diagram of FIG. 5, the D.C. choke circulator 100 functions as follows. B-plus is supplied to input port (1). Current components I1 and I1' flow to ports (2) and (3) to charge capacitors $C_1$ and $C_1'$, respectively. If a balanced load condition exists (with no transistor switch-through), each square wave chopper is supplied by the steady-state currents established in choke $L_1$ and $L_1'$. When transistor switch-through exist, the choke fed ports (2) and (3) reduces the voltage to those ports by L di/dt; where di is the switch through current and dt is the time duration. Following the switch-through period, stored energy in the chokes ($Li^2/2$ causes the voltage at ports (2) and (3) to rise above B-plus. This action thus transfers the stored energy to integrate capacitors $C_1$ and $C_1'$ via clamp diodes $D_1$ and $D_1'$. Since the voltage on the storage capacitors is now greater than the B-plus, currents 13 and 13' flow to ports (2) and (3) to augment the current supplied to the two choppers. Thus, the energy is recovered.

In the case of inductive loads which return stored energy to either capacitor $C_1$ and $C_1'$; the energy is recovered to its complement port by the same action related above. If the load is suddenly removed (normal current trip) or when abnormally high currents flow through the circulator inductors (short circuit condition), clamp capacitors $C_1$ or $C_1'$ can charge up well in excess to the B-plus supply voltage. To limit this voltage excursion, tranzorbs VR and VR' are set to clip at approximately 120% of B-plus voltage.

(The converter schematic-block diagram of FIG. 5 shows how the outputs of two phase control choppers are combined magnetically via transformers T and $T_1$. The slip-slide chopper outputs overlap throughout the deviation range. Thus, only the leakage inductance of the transformers is reflected back to the choppers. This minimizes the L di/dt switching transient reflected to the choppers. The energy reduction is proportionate to the ratio of leakage to open circuit inducatance. The ratio may vary from one to three orders of magnitude, depending on transformer design and voltage isolation.) The reduced magnitude of L di/dt voltage and energy of switching transients, accordingly enhances converter reliability and efficiency over that of a conventional signal phase chopper.

Figure 7:
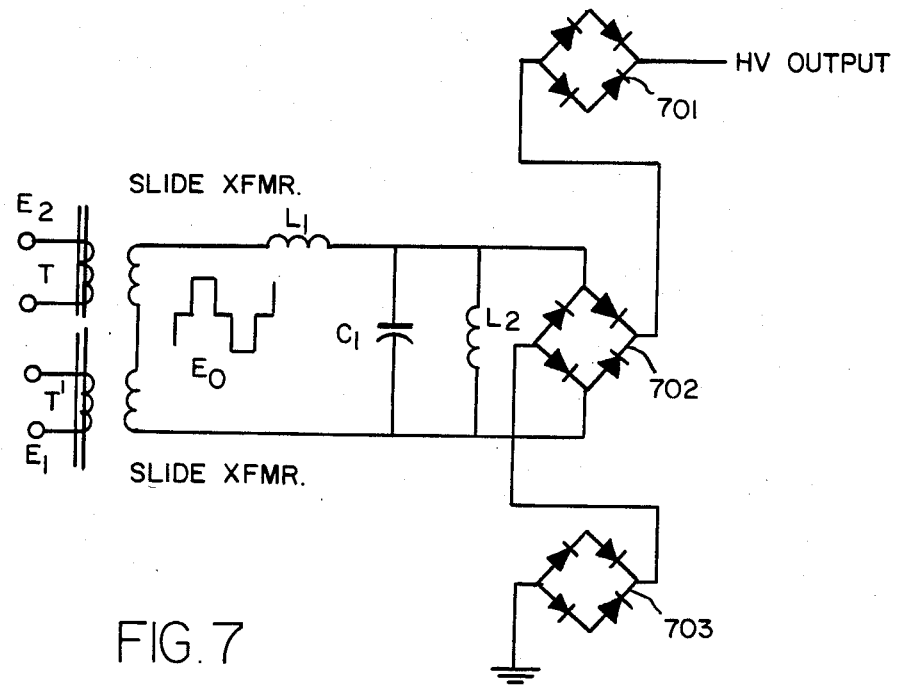
FIG. 7 is a circuit diagram of the lumped constant suppression circuit which may be used as the combiner in the system of FIGS. 1 and 5.

An extension of the design of the present invention is the lumped constant suppression system of FIG. 7, which uses lumped constants in each secondary Lo, and $Lo_2$. In addition, to suppressing beat modulation, the circuit provides individual rectifier current limiting. Thus, one or more secondary rectifier quads can fail without affecting power supply performance.

FIG. 7 shows one secondary of a slip-slide stacked rectifier high-voltage supply. To isolate high-frequency ringing, choke $L_1$ and capacitor $C_1$ are selected to resonate at a frequency below the chopper fundamental. The value of choke $L_1$ is selected to limit the a-c current at two-times the rectifier full load current. To limit the $L_1$ and $C_1$ tank current at no-load, choke $L_2$ is added to resonate capacitor $C_1$ at near the chopper frequency. Output full-load to no-load open-loop voltage difference is minimized by making the characteristic impedance of the parallel tank equal to full-load D.C. resistance. During the no-load condition, large reactive currents generated by choke $L_1$ are returned to the choppers. If this energy is not clamped, chopper transistor failure may occur.

An alternate approach to that shown in FIG. 7 is to make choke $L_1$ saturate at medium load conditions; thereby providing high-frequency isolation at no and light loads while providing damping at higher loads. Capacitor $C_1$ and choke $L_2$ would not be necesary in this configuration, thus eliminating no-load reactive current flow.

Figure 8:
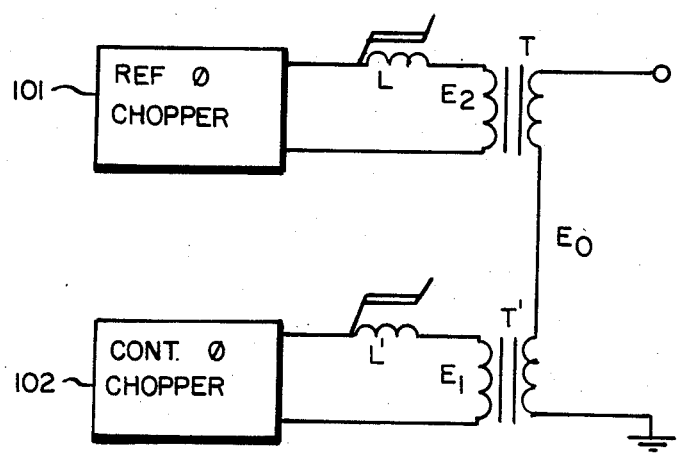
FIG. 8 is a circuit diagram of the saturable core suppression circuit, useable as the combiner in the system of FIG. 1 and FIG. 5.

This approach becomes more practical if the saturable core chokes are placed in the primaries of the slip-slide transformers. Such an arrangement is shown in FIG. 8. Only one choke is actually required in either primary, since the two choppers are tightly coupled through secondary windings. Many variations of this approach are possible. The core can be made to saturate as a function of peak A.C. load currents or a D.C. current applied to an auxiliary bias winding. Bias control can be derived from either the prime power D.C. current or high-voltage load current. The various control circuits are too numerous to elaborate on.

The circuit given in FIG. 8 is intended for use in the advanced F-16 150 KHZ, 3 KW, 25 KV power supply design. Full-load and no-load open loop output voltages are montonic over a 95% deviation range. Full load efficiency is on the order of 90%.

The saturable core choke of FIG. 8 can be used as the combiner 103 of FIGS. 1 and 5, and is electrically connected with the reference phase chopper 101 and continuous phase chopper 102 as shown to algebraically combine their signals into the converted output signal $E_o$, as described above. Similarly, the lumped sum constant suppression circuit of FIG. 7 can receive $E_2$ and $E_1$ over the primary windings of transformers T and T' from the square wave choppers 101 and 102 of FIG. 5, and magnetically combine them into the high-voltage (HV) output of one of the three diode quads 701–703 as described above. As noted above, the system of FIG. 7 has its choke in the circuit connected with the secondary windings while the system of FIG. 8 has its choke in one of the primary windings of n of the transformers T and T'.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A slip slide power converter comprising:
a choke feed direct current circulator which receives and splits a direct current input signal to produce therefrom first and second voltage output signals and provide thereby current limiting on said direct current input signal;
first and second second square wave choppers which are electrically connected to and which respectively receive said first and second voltage outputs signals from said choke feed direct current circulator, said first and second square wave choppers respectively producing therefrom first and second continuous wave square wave signals having phases which are out of phase with other, said first and second square wave choppers each respectively receiving a first and second phase control signal to adjust the phases of the first and second continuous wave square wave signals that they produce;
a combiner which receives and algebraically combines the first and second continuous wave square wave signals from the first and second square wave choppers, said combiner thereby producing a converted square wave output signal which represents a converted version of said direct current input signal; and
a means for producing said first and second phase control signals for said first and second square wave choppers, said producing means sampling said converted square wave output signal from said combiner for phase error and producing said first and second phase control signals to minimize said phase error, said producing means thereby reducing degradation in said converted square wave output signal.

2. A slip slide power converter, as defined in claim 1, wherein said combiner comprises:
a first and second transformer which respectively receive said first and second continuous wave square wave signals from said first and second square wave choppers, said first and second transformer each having secondary windings which are electrically connected in series to algebraically combine said first and second continous wave square wave signals; and a diode quad which is electrically connected in series with said first and second transformer to output said converted square wave output signal.

3. A slip slide power converter, as defined in claim 2, wherein said choke feed direct current circulator comprises:

first and second inductor pairs which are electrically connected in parallel with each other and which receive and split said direct current input signal;

a first and second diode which are respectively connected in parallel with said first and second inductor pairs and are biased towards a common electrical ground;

a first and second capacitor which respectively connect said first and second diodes with said common electrical ground;

first and second tranzorbs which are respectively connected in parallel with said first and second capacitors to connect said common electrical ground with first and second junctions between said first diode and said first inductor pair and said second diode and said second inductor pair; and first and second output terminals which respectively output said first and second voltage output signals; said first output terminal electrically connecting said first junction with said first square wave chopper and said second output terminal electrically connecting said second junction with said second square wave chopper.

4. A slip slide power converter, as defined in claim 3, wherein said producing means comprises:

a phase detector which performs phase detection on said converted square wave output signal from said combiner to produce thereby a phase error signal; and a phase controller which receives said phase error signal from said phase detector and produces therefrom said first and second phase control signals which are sent respectively to said first and second square wave choppers in order to minimize said phase error signal.

5. A slip slide power converter, as defined in claim 1, wherein said combiner comprises a saturable core suppression circuit which is electrically connected with said first and second square wave choppers to produce said converted square wave output signal, said saturable core suppression circuit having first and second transformers which are respectively connected with said first and second square wave choppers by their primary wingings while their secondary windings are connected in a series circuit to magnetically and algebraically combine said first and second continuous wave signals, said saturable core suppression circuit having a saturable core choke in said primary windings of one of the transformers to provide high-frequency isolation at light loads and damping at higher loads.

6. A slip slide power converter, as defined in claim 5, wherein said saturable core suppression circuit comprises:

a first and second transformer each having a primary winding which is respectively connected with said first and second square wave chopper, said first and second transformer having secondary windings which are electrically connected in a series circuit to magnetically combine signals they receive from the primary windings; and a choke inductor which electrically connects a primary winding to one of the square wave choppers, said choke inductor having an inductance value which is selected to saturate at medium load conditions and thereby provide high-frequency isolation at light load conditions while providing damping at high load conditions.

7. A slip slide power converter, as defined in claim 6, wherein said choke inductor is electrically connected between said primary winding of said first transformer and said first square wave chopper.

8. A slip slide power converter, as defined in claim 6, wherein said choke inductor is electrically connected between said primary winding of said second transformer and said second square wave chopper.

9. A slip slide power converter, as defined in claim 1, wherein said combiner comprises a lumped constant suppression circuit with a plurality of transformers with primary windings which are connected with said first and second square wave choppers and secondary windings which are connected in series to magnetically combine signals received by said primary windings, said lumped constant suppression circuit having a choke connected with said secondary windings to provide high-frequency isolation at light loads and frequency damping at heavy loads.

10. A slip slide power converter, as defined in claim 9, wherein said lumped constant suppression circuit comprises:

first and second transformers having primary windings which are respectively connected with said first and second square wave choppers, said first and second transformers having secondary windings which are electrically connected in series to magnetically and algebraically combine signals received from the primary windings;

a first choke inductor having an input terminal which is electrically connected with said secondary windings of said first transformer; said first choke inductor having an output terminal;

a choke capacitor which electrically connects the output terminal of said first choke inductor with said secondary winding of said transformer;

a second choke inductor which is electrically connected in parallel with said choke capacitor; and a first output diode quad which is electrically connected in parallel with said second choke inductor to output said converted square wave output signal.

11. A slip slide power converter, as defined in claim 10, wherein said lumped constant suppression circuit includes second and third output diode quads which are electrically connected with opposing diagonals of said first output diode quad, said second output diode quad receiving and outputting said converted square wave output signal and said third output diode quad being electrically connected with a common electrical ground.

* * * * *